US010326658B2

(12) United States Patent
Chen et al.

(10) Patent No.: US 10,326,658 B2
(45) Date of Patent: Jun. 18, 2019

(54) ZONE CONTROL SYSTEM AND METHOD OF AUTOMATICALLY CONFIGURING THE SAME

(71) Applicant: DELTA ELECTRONICS, INC., Taoyuan County (TW)

(72) Inventors: Meng-Seng Chen, Taoyuan County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 657 days.

(21) Appl. No.: 14/887,723

(22) Filed: Oct. 20, 2015

(65) Prior Publication Data

US 2016/0127187 A1 May 5, 2016

(30) Foreign Application Priority Data

Oct. 30, 2014 (TW) .............................. 103137535 A

(51) Int. Cl.
*H04L 12/24* (2006.01)
*H04L 12/28* (2006.01)

(52) U.S. Cl.
CPC ...... *H04L 41/0886* (2013.01); *H04L 12/2803* (2013.01); *H04L 41/0833* (2013.01); *H04L 41/0836* (2013.01); *H04L 41/22* (2013.01)

(58) Field of Classification Search
CPC . H04L 41/0886; H04L 41/0836; H04L 41/22; H04L 41/0833; H04L 12/2803
See application file for complete search history.

(56) References Cited

U.S. PATENT DOCUMENTS

| | | |
|---|---|---|
| 6,745,105 B1 | 6/2004 | Fairlie et al. |
| 6,912,450 B2 | 6/2005 | Fairlie et al. |
| 7,032,360 B2 | 4/2006 | Rutten et al. |

(Continued)

FOREIGN PATENT DOCUMENTS

| | | |
|---|---|---|
| CN | 1733597 | 2/2006 |
| CN | 101063884 | 10/2007 |

(Continued)

OTHER PUBLICATIONS

Office Action dated Feb. 19, 2016 from corresponding application No. TW 103137535.

(Continued)

*Primary Examiner* — Abdulkader M Alriyashi
(74) *Attorney, Agent, or Firm* — Hauptman Ham, LLP

(57) ABSTRACT

A zone control system includes a zone controller (ZC), an apparatus control node, and a sensor. The ZC includes a LAN structure template which records a network topology in a zone where the ZC is installed. The ZC executes calculations of correlation degree for adjacent apparatus control nodes and sensors, automatically connects to the highest correlation degree of the apparatus control nodes, and controls the connected apparatus control nodes to connect to the highest correlation degree of the sensors according to the calculation results and the LAN structure template. Accordingly, the ZC can automatically configure the LAN structure in the zone where the ZC is installed and establish a zone control system in the zone.

7 Claims, 8 Drawing Sheets

(56) References Cited

U.S. PATENT DOCUMENTS

| | | | |
|---|---|---|---|
| 7,120,680 B1 * | 10/2006 | Higgins | H04L 41/12 709/220 |
| 7,181,316 B2 | 2/2007 | Fairlie et al. | |
| 7,519,453 B2 | 4/2009 | Fairlie et al. | |
| 7,565,224 B2 | 7/2009 | Fairlie et al. | |
| 7,725,764 B2 | 5/2010 | Morosan et al. | |
| 7,975,174 B2 | 7/2011 | Morosan et al. | |
| 8,063,750 B2 | 11/2011 | Knibbe | |
| 8,683,257 B2 | 3/2014 | Morosan et al. | |
| 8,909,977 B2 | 12/2014 | Morosan et al. | |
| 9,049,038 B2 | 6/2015 | Cavalcanti | |
| 2004/0131508 A1 | 7/2004 | Fairlie et al. | |
| 2004/0194382 A1 | 10/2004 | Fairlie et al. | |
| 2004/0199294 A1 | 10/2004 | Fairlie et al. | |
| 2004/0199295 A1 | 10/2004 | Fairlie et al. | |
| 2005/0145505 A1 | 7/2005 | Fairlie et al. | |
| 2007/0179672 A1 | 8/2007 | Fairlie et al. | |
| 2007/0233323 A1 | 10/2007 | Wiemeyer et al. | |
| 2008/0126832 A1 | 5/2008 | Morosan et al. | |
| 2010/0198718 A1 | 8/2010 | Morosan et al. | |
| 2010/0231363 A1 | 9/2010 | Knibbe | |
| 2010/0241245 A1 | 9/2010 | Wiemeyer et al. | |
| 2011/0225448 A1 | 9/2011 | Morosan et al. | |
| 2012/0203841 A1 * | 8/2012 | Cavalcanti | G05B 19/4185 709/204 |
| 2014/0115380 A1 | 4/2014 | Morosan et al. | |
| 2015/0179058 A1 * | 6/2015 | Crafts | G08C 17/02 340/12.5 |

FOREIGN PATENT DOCUMENTS

| | | |
|---|---|---|
| CN | 102385065 | 3/2012 |
| CN | 102549974 | 7/2012 |
| CN | 103176516 | 6/2013 |
| WO | WO2008/001267 | 1/2008 |
| WO | WO2008/014585 | 2/2008 |

OTHER PUBLICATIONS

Office Action dated Nov. 1, 2017 from corresponding application No. CN 2014106080283.

* cited by examiner

ZONE CONTROL SYSTEM AND METHOD OF AUTOMATICALLY CONFIGURING THE SAME

BACKGROUND

1. Technical Field

The present disclosure relates generally to a zone control, and more particularly to a zone control system and a method of automatically controlling the same.

2. Description of Related Art

In recent years, many new buildings have been designed and developed toward the rising intelligent buildings.

In the existing intelligent buildings, many sensors and apparatus controllers are installed or configured in the building to sense various environmental parameters, thereby adjusting environmental amenity by controlling electrical devices installed in the building according to the environmental parameters.

In the conventional practices, the interior of the building is usually divided into a plurality of zones, and at least one sensor, at least one apparatus controller, and an exclusive smart controller are installed inside each of the zones, respectively. In particular, the smart controller is used to receive information of the all apparatus controllers and the sensors, and transmit information to and receive information from the smart controllers in other zones.

In general, each of the smart controllers, the apparatus controllers, and the sensors has its own identification code, such as a device number or a media access control (MAC) address. The installation personnel usually build a mapping table for configuring the LAN structure in the zones before physically installing the smart controllers, the apparatus controllers, and the sensors in the building.

For example, the contents of the mapping table record: the first zone includes a smart controller with a number of A00001, an apparatus controller with a number of B00001, and a sensor with a number of C00001; the second zone includes a smart controller with a number of A00002, two apparatus controllers with numbers of B00002 and B00003, and three sensors with numbers of C00002, C00003, and C00004.

Configuring the LAN structure in the zones, the installation personnel can operate a computer to login the smart controller via a web server and control the smart controller to connect to the corresponding apparatus controllers and the sensors according to the mapping table, thereby accomplishing the configuration of the LAN structure.

However, the installation personnel have to spend a lot of statistics or calculation time building the mapping table. Also, the installation personnel must spend significant time manually configuring the LAN structure if the number of the zones in the building is much greater.

SUMMARY

An object of the present disclosure is to provide a zone control system and a method of automatically configuring the same and a controller in the zone is provided to automatically configure a LAN structure and establish a zone control system in the zone.

In order to achieve the above-mentioned object, the present disclosure provides a zone control system which includes a zone controller, at least one apparatus control node, and at least one sensor. The zone controller has a LAN structure template which records a network topology adopted by the zone controller. The zone controller executes calculations of correlation degree for adjacent apparatus control nodes and sensors, automatically connects to the highest correlation degree of the apparatus control nodes, and controls the connected apparatus control nodes to connect to the highest correlation degree of the sensors according to the calculation results and the LAN structure template.

In the present disclosure, the zone controller establishes a zone control system in the zone according to the LAN structure; wherein the LAN structure and the zone control system meet the network topology recorded in the LAN structure template.

The technology efficiency of the present disclosure is that one zone controller in a zone automatically selects the apparatus control nodes and sensors to configure a LAN structure and establish a zone control system in the zone. The zone controller can automatically configure the zone controller to connect to the one or more than one apparatus control nodes, and the connected apparatus control nodes to connect to the one or more than one sensors without user's manual configuration. Accordingly, the zone control system can be rapidly established to save unnecessary significant configuration time.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Figure 1:
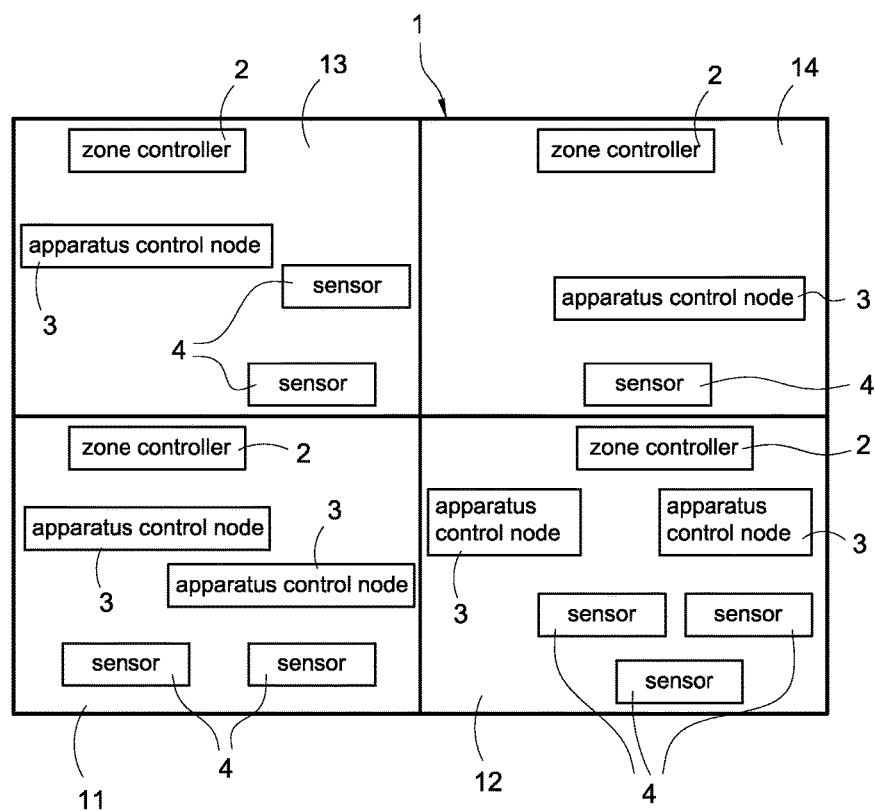
FIG. 1 is a schematic view of a zone control system according to a first embodiment of the present disclosure.

Reference will now be made to the drawing figures to describe the present invention in detail.

Reference is made to FIG. 1 which is a schematic view of a zone control system according to a first embodiment of the present disclosure. The present invention disclosures a zone control system, which is installed inside a zone, is provided to sense various environmental parameters, thereby controlling the corresponding devices to adjust environmental amenity according to the sensed environmental parameters.

A building 1 having several zones is disclosed in FIG. 1, and the zones are located on the same floor or different floors. In this embodiment, four zones, namely, a first zone 11, a second zone 12, a third zone 13, and a fourth zone 14 are exemplified for demonstration and not for limitation of the present disclosure. Each of the zones 11-14 installs one zone control system. More specifically, there are preferably four zone control systems installed in the building 1 when the building 1 has four zones; and there are preferably ten zone control systems installed in the building 1 when the building 1 has ten zones; and so forth.

The zone control system mainly includes a zone controller (ZC) 2, at least one apparatus control node 3, and at least one sensor 4. As shown in FIG. 1, the zone control system in the first zone 11 includes one ZC 2, two apparatus control nodes 3, and two sensors 4; the zone control system in the second zone 12 includes one ZC 2, two apparatus control nodes 3, and three sensors 4; the zone control system in the third zone 13 includes one ZC 2, one apparatus control node 3, and two sensors 4; and the zone control system in the fourth zone 14 includes one ZC 2, one apparatus control node 3, and one sensor 4. However, this example is for demonstration and not for limitation of the present disclosure.

The sensors 4 are used to sense various indoor and outdoor environmental parameters, such as temperature, humidity, personnel access, personnel activity, personnel clothing quantity, or so on and the environmental parameters are provided to the connected apparatus control nodes 3. In this embodiment, each sensor 4 can be a T/H sensor, a PIR (pyroelectric infrared) sensor, or so on, but not limited.

For the same zone, the apparatus control nodes 3 are connected to the sensors 4. According to the sensed environmental parameters, the installed electrical devices (not shown), such as fans, air conditioners, dehumidifiers, electric lights, or so on are controlled to adjust environmental amenity in the corresponding zone. In addition, the apparatus control nodes 3 provide operation conditions of the electrical devices to the corresponding ZCs 2. In this embodiment, the apparatus control node 3 can be a fan controller, a light controller, or so on, but not limited.

The ZCs 2 are connected to the corresponding apparatus control nodes 3 at the same zone to receive the corresponding returned data, such as the operation conditions of the electrical devices or the sensed environmental parameters from the apparatus control nodes 3. Accordingly, the ZCs 2 can execute the optimal calculation for the environmental conditions by an algorithm. In addition, the ZCs 2 can transmit the above-mentioned data to other ZCs 2 in the building 1 via the wireless communication so that the ZCs 2 can be connected to each other to realize current states of other zones. Especially, the ZCs 2, the apparatus control nodes 3, and the sensors 4 all have the wireless network connection function to establish wireless connections to each other.

As shown in FIG. 1, the ZCs 2, the apparatus control nodes 3, and the sensors 4 are physically installed in the building 1, but are not configured. More specifically, the ZCs 2, the apparatus control nodes 3, and the sensors 4 have to be mutually configured by users after being physically installed. Also, the ZCs 2, the apparatus control nodes 3, and the sensors 4 can be automatically configured by the corresponding ZCs 2 in the present invention to build the above-mentioned zone control system.

Figure 2:
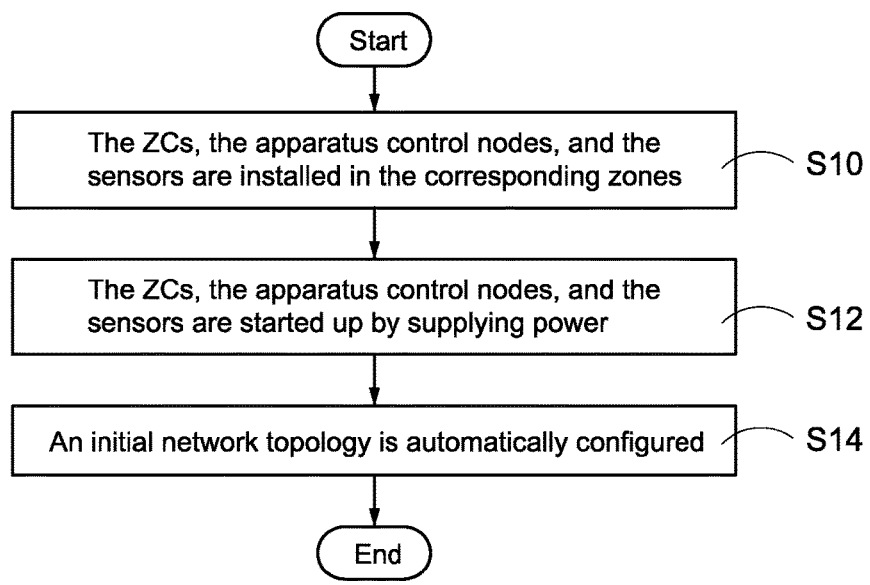
FIG. 2 is a flowchart of starting up the zone control system according to the first embodiment of the present disclosure.

Reference is made to FIG. 2 which is a flowchart of starting up the zone control system according to the first embodiment of the present disclosure. First, the ZCs 2, the apparatus control nodes 3, and the sensors 4 are installed in the corresponding zones 11-14 of the building 1 (S10).

Afterward, the ZCs 2, the apparatus control nodes 3, and the sensors 4 are started up by supplying power (S12). In this embodiment, an initial network topology is automatically configured after the ZCs 2 are started up (S14). For example, a ZC (A) is automatically connected to the nearest apparatus control node (A) and the apparatus control node (A) is automatically connected to the nearest sensor (A) after the ZC (A) is started up. Accordingly, the initial network topology is completely configured. However, this example is for demonstration and not for limitation of the present disclosure. In other words, the step (S14) is not essential.

Figure 3:
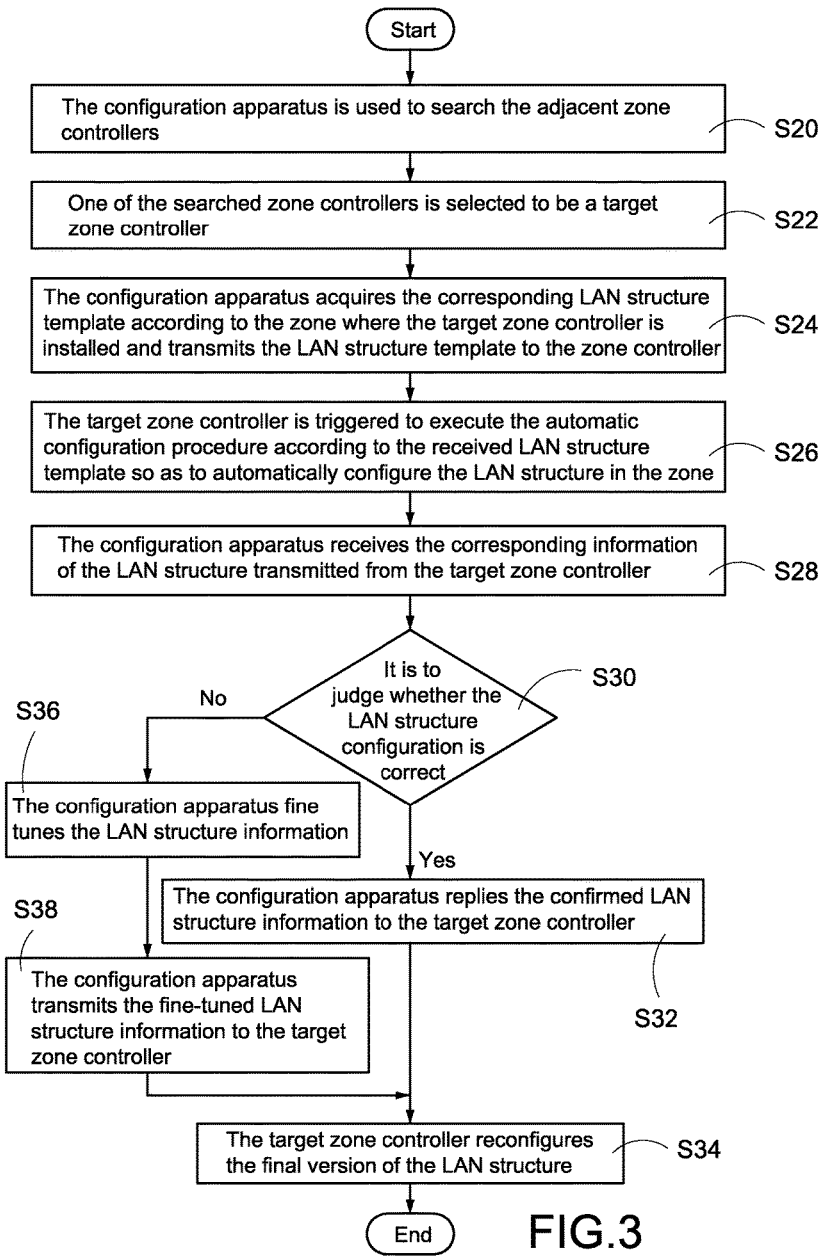
FIG. 3 is a flowchart of automatically configuring the zone control system according to the first embodiment of the present disclosure.

Reference is made to FIG. 3 which is a flowchart of automatically configuring the zone control system according to the first embodiment of the present disclosure. The user has to use an additional configuration apparatus, such as a configuration apparatus 5 shown in FIG. 4A. In this embodiment, the configuration apparatus 5 is a portable electronic apparatus with wireless connection capability, such as a tablet PC, a notebook computer, or a smart phone, but not limited. One or more than one pre-defined LAN structure templates, such as the LAN structure template T1 shown in FIG. 4C are stored in the configuration apparatus 5. In particular, each of the LAN structure templates T1 records different network topologies and the network topologies are applicable for the different zones 11-14.

More specifically, the network topology herein means a topological structure of a network. The topological structure mainly records logical connection relations but not absolute connection relations among all nodes, such as the zone controller 2, the apparatus control nodes 3, and the sensors 4 in the zone. For example, it is assumed that an apparatus control node A is used to control an air conditioner A in the zone A, and a sensor A is installed in the zone B and a sensor B is installed in the zone A. Because the apparatus control node A is operated in the logical connection relation but not the absolute connection relation, the sensor B, which is installed in the same zone A as the apparatus control node A, has highest priority to be connected to the apparatus control node A, instead of the sensor A.

In this embodiment, the configuration apparatus 5 is first used by the user to search all of the ZCs 2 which are close to the configuration apparatus 5 (S20). Also, a list of all searched ZCs 2 is shown on a display monitor after the search operation is finished. In this embodiment, the Wi-Fi direct, Bluetooth, ZigBee, RF (radio frequency), or NFC (near field communication) are/is adopted by the configuration apparatus 5 and the ZCs 2, and the configuration apparatus 5 can use any one of the above-mentioned wireless protocol to search the ZCs 2. However, these examples are for demonstration and not for limitation of the present disclosure.

Afterward, the user can operate the configuration apparatus 5 to select one of the searched ZCs 2 for executing the automatic configuration procedure, and the selected ZC 2 is to be a target zone controller (target ZC) (S22). After the step (S22), the configuration apparatus 5 acquires the corresponding LAN structure template T1 according to the zone where the target zone controller is installed and transmits the LAN structure template T1 to the zone controller (S24).

The LAN structure template T1 transmitted in the step (S24) records the network topology in the zone where the target zone controller is installed. Especially, the user can customize the required LAN structure template(s) according to customer demands. If the identical network topology is adopted by two or more than two zones, the identical LAN structure template T1 can be adopted for the different zones so that the same LAN structure template T1 can be repeatedly used to save the time of duplication of the LAN structure template T1.

Figure 4A:
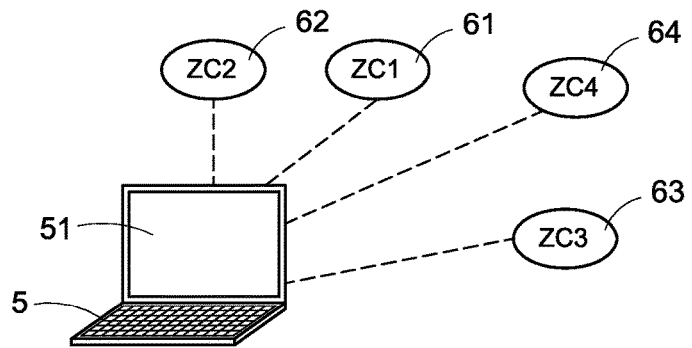
FIG. 4A is a first connection view according to the first embodiment of the present disclosure.
Figure 4B:
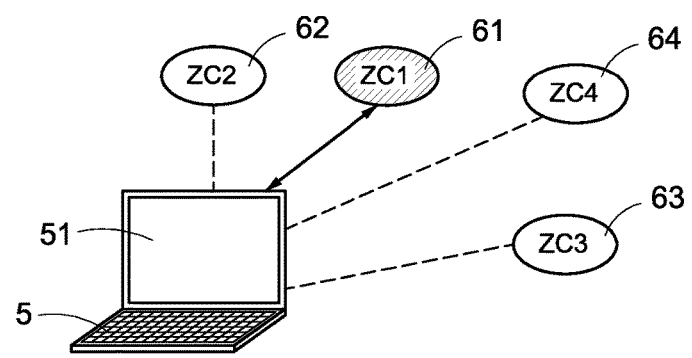
FIG. 4B is a second connection view according to the first embodiment of the present disclosure.
Figure 4C:
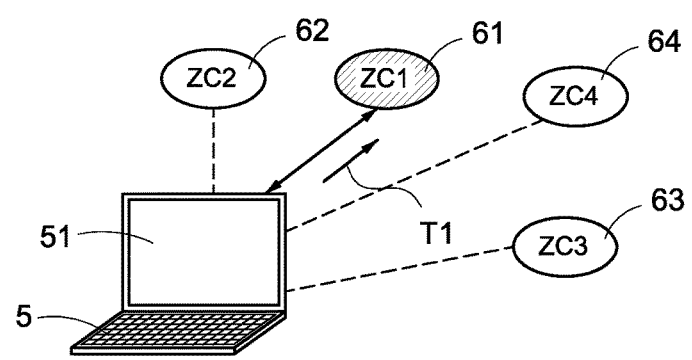
FIG. 4C is a third connection view according to the first embodiment of the present disclosure.

Reference is made to FIGS. 4A, 4B, and 4C which are a first connection, a second connection, and a third connection views according to the present disclosure, respectively.

In the embodiment shown in FIG. 4A, the configuration apparatus 5 can search out a first zone controller (ZC1) 61, a second zone controller (ZC2) 62, a third zone controller (ZC3) 63, and a fourth zone controller (ZC4) 64 which are close to the configuration apparatus 5. In particular, the four ZCs 61-64 are installed in four different zones. In addition, the searched zone controllers ZC1-ZC4 are listed and shown on a display monitor 51 for the user's selection.

As shown in FIG. 4B, the configuration apparatus 5 can directly establish a communication connection to the target zone controller when the user selects one of the four ZCs 61-64 to be the target zone controller, thereby triggering the target zone controller to execute the automatic configuration procedure. In particular, the first zone controller (ZC1) 61 is exemplified for the target zone controller in this embodiment.

Especially, the configuration apparatus 5 first transmits a control command to the target zone controller, namely the ZC1 61, after successfully connecting to the target zone controller. Accordingly, the target zone controller provides a light indication to notify the user that which target zone controller has been completely connected. In addition, the user can judge whether the lighted target zone controller is really the selected target zone controller according to the light indication. For example, the lighted target zone controller is the target zone controller installed in the zone selected by the user.

Besides the light indication, other indication or notification manners, such as a sound notification or specific words shown on the display monitor can be adopted to notify the user in other embodiments.

As shown in FIG. 4C, the configuration apparatus 5 can acquire the corresponding LAN structure template T1 and transmits the LAN structure template T1 to the target zone controller according to the zone where the target zone controller is installed after establishing the communication connection to the target zone controller. In this embodiment, the LAN structure template T1 is stored in the configuration apparatus 5 and transmitted to the target zone controller after the communication connection is established between the configuration apparatus 5 and the target zone controller. In other embodiments, the LAN structure template T1 can be stored in the target zone controller before the target zone controller is physically installed in the building 1. In other words, the step (S24) is not essential.

Figure 5:
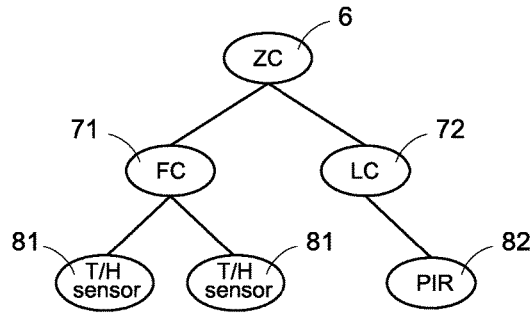
FIG. 5 is a schematic view of a LAN structure template according to the first embodiment of the present disclosure.

Reference is made to FIG. 5 which is a schematic view of a LAN structure template according to the first embodiment of the present disclosure. The LAN structure template T1 records a network topology which includes a zone controller (ZC) 6, a fan controller (FC) 71, a light controller (LC) 72, two temperature/humidity sensors (T/H sensors) 81, and a pyroelectric infrared sensor (PIR sensor) 82. In particular, the zone controller (ZC) 6 is simultaneously connected to the fan controller (FC) 71 and the light controller (LC) 72; the fan controller (FC) 71 is simultaneously connected to the two temperature/humidity sensors (T/H sensors) 81; and the light controller (LC) 72 is connected to the pyroelectric infrared sensor (PIR sensor) 82.

As mentioned above in FIG. 3, the configuration apparatus 5 transmits the LAN structure template T1 to the target zone controller in the step (S24). Accordingly, the configured LAN structure and the established zone control system must be meet the network topologies recorded in the LAN structure template T1 after the automatic configuration procedure is completed by the target zone controller.

More specifically, the completed zone control system must contain one target zone controller, one fan controller (FC) 71, one light controller (LC) 72, two temperature/humidity sensors (T/H sensors) 81, and one pyroelectric infrared sensor (PIR sensor) 82 when the LAN structure template T1 shown in FIG. 5 is adopted by the configuration apparatus 5. In particular, the target zone controller 6 is simultaneously connected to the fan controller (FC) 71 and the light controller (LC) 72; the fan controller (FC) 71 is simultaneously connected to the two temperature/humidity sensors (T/H sensors) 81; and the light controller (LC) 72 is connected to the pyroelectric infrared sensor (PIR sensor) 82. In addition, the fan controller (FC) 71, the light controller (LC) 72, the temperature/humidity sensors (T/H sensors) 81, and the pyroelectric infrared sensor (PIR sensor) 82 are located in the same zone with the target zone controller.

After the step (S24), the target zone controller is triggered by the configuration apparatus 5 to execute the automatic configuration procedure according to the received LAN structure template T1 so as to automatically configure the LAN structure in the zone (S26). Accordingly, the zone control system is jointly by the target zone controller, one or more than one apparatus control nodes 3, and one or more than one sensors 4. More specifically, the target zone controller searches the apparatus control node(s) 3 and the sensor(s) 4 which are close to the target zone controller by a calculation of correlation degree. In other words, the highest correlation degree of the apparatus control node(s) 3 and the sensor(s) 4 are searched out by the target zone controller. Accordingly, the zone control system is jointly by the target zone controller, the highest correlation degree of the apparatus control node(s) 3 and the sensor(s) 4.

In this embodiment, the target zone controller can produce different "costs" for the apparatus control node(s) 3 and the sensor(s) 4 as a basis for comparison of the correlation degree according to the calculated results of the correlation degree. However, this example is for demonstration and not for limitation of the present disclosure.

Figure 6:
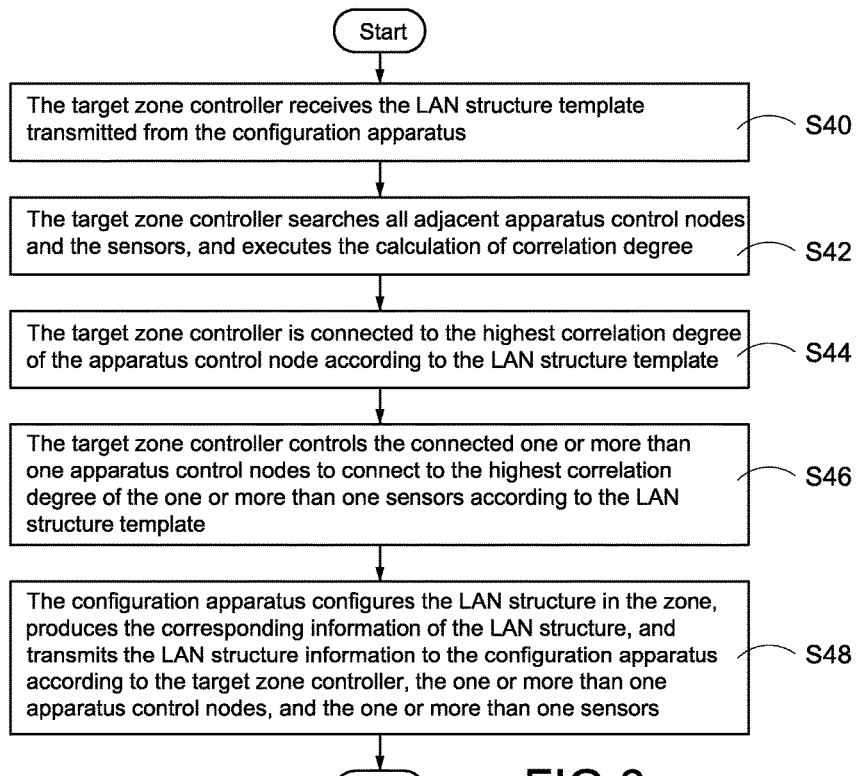
FIG. 6 is a flowchart of automatically configuring a zone control system according to the first embodiment of the present disclosure.

Reference is made to FIG. 6 which is a flowchart of automatically configuring a zone control system according to the first embodiment of the present disclosure. After the step (S24), the target zone controller can receive the LAN structure template T1 transmitted from the configuration apparatus 5 (S40). At the same time, the target zone controller searches all adjacent apparatus control nodes 3 and the sensors 4, and executes the calculation of correlation degree (S42).

In this embodiment, the target zone controller can be respectively connected to the searched adjacent apparatus control nodes 3 and the sensors 4, and analyze signal strength of all the apparatus control nodes 3 and the sensors 4. In addition, the target zone controller can use a wireless node positioning technology to acquire relative positions of the searched apparatus control nodes 3 and the sensors 4 so as to calculate the corresponding distances between the target zone controller and the searched apparatus control nodes 3 and the sensors 4. Accordingly, the target zone controller can respectively calculate "costs" of the apparatus control nodes 3 and the sensors 4 according to the signal strength and/or the corresponding distances. The calculated "costs" are determined the correlation degrees between the target zone controller and the searched apparatus control nodes 3, and the correlation degrees between the searched apparatus control nodes 3 and the searched sensors 4. In this embodiment, the correlation degree is higher with the higher "cost". However, this example is for demonstration and not for limitation of the present disclosure.

After the step (S42), the target zone controller is connected to the highest correlation degree of the apparatus control node(s) 3 according to the LAN structure template T1 (S44). In particular, the LAN structure template T1 records the type and the number of the apparatus control nodes 3 which are connected to the target zone controller.

In addition, the target zone controller can control the connected one or more than one apparatus control nodes 3 to connect to the highest correlation degree of the one or more than one sensors 4 according to the LAN structure template T1 (S46). In particular, the LAN structure template T1 records the type and the number of the sensors 4 which are connected to the one or more than one sensors 4. More specifically, the target zone controller notifies the apparatus control nodes 3 that which type and how many sensor(s) to be connected.

After the step (S46), the configuration apparatus 5 configures the LAN structure in the zone, produces the corresponding information of the LAN structure, and transmits the LAN structure information to the configuration apparatus 5 according to the target zone controller, the one or more than one apparatus control nodes 3, and the one or more than one sensors 4 (S48). Accordingly, the automatic configuration procedure is completed by the target zone controller and also the zone control system in the zone is established.

As shown in FIG. 3, the configuration apparatus 5 can receive the corresponding information of the LAN structure (also referred to as the "LAN structure information") transmitted from the target zone controller after the automatic configuration procedure is completed by the target zone controller (S28). In particular, the LAN structure information records the current LAN structure in the zone.

After the step (S28), the configuration apparatus 5 displays the LAN structure information on the display monitor 51, and then the user can judge whether the LAN structure configuration is correct or not according to the LAN structure information (S30). More specifically, the user can judge whether the LAN structure meets a predetermined expectation according to the following conditions:

1. It is to judge whether the type and the number of the apparatus control nodes 3 connected to the target zone controller meet the LAN structure template T1;

2. It is to judge whether the type and the number of the sensors 4 connected to the apparatus control nodes 3 meet the LAN structure template T1; and 3. It is to judge whether the target zone controller, the apparatus control nodes 3, and the sensors 4 are installed in the same zone.

The configuration apparatus 5 replies the confirmed LAN structure information to the target zone controller when the LAN structure configuration is correct (S32). The target zone controller reconfigures the final (latest) version of the LAN structure and establishes the zone control system with the latest LAN structure according to the received LAN structure information (S34).

If the LAN structure configuration is not correct in the step (S30), the configuration apparatus 5 can fine tune the LAN structure information by user's external operations (S36). In particular, the incorrect LAN structure configuration includes any one of the following conditions:

1. The type and the number of the apparatus control nodes 3 connected to the target zone controller do not meet the LAN structure template T1;

2. The type and the number of the sensors 4 connected to the apparatus control nodes 3 do not meet the LAN structure template T1; and 3. The target zone controller, the apparatus control nodes 3, and the sensors 4 are not installed in the same zone.

The purpose of the step (S36) is to correct the wrong part(s) of the LAN structure configured by the target zone controller to meet the predetermined expectation. After the step (S36), the configuration apparatus 5 transmits the fine-tuned LAN structure information to the target zone controller (S38). Accordingly, the target zone controller reconfigures the final (latest) version of the LAN structure and establishes the zone control system with the latest LAN structure according to the received fine-tuned LAN structure information (S34).

Figure 7:
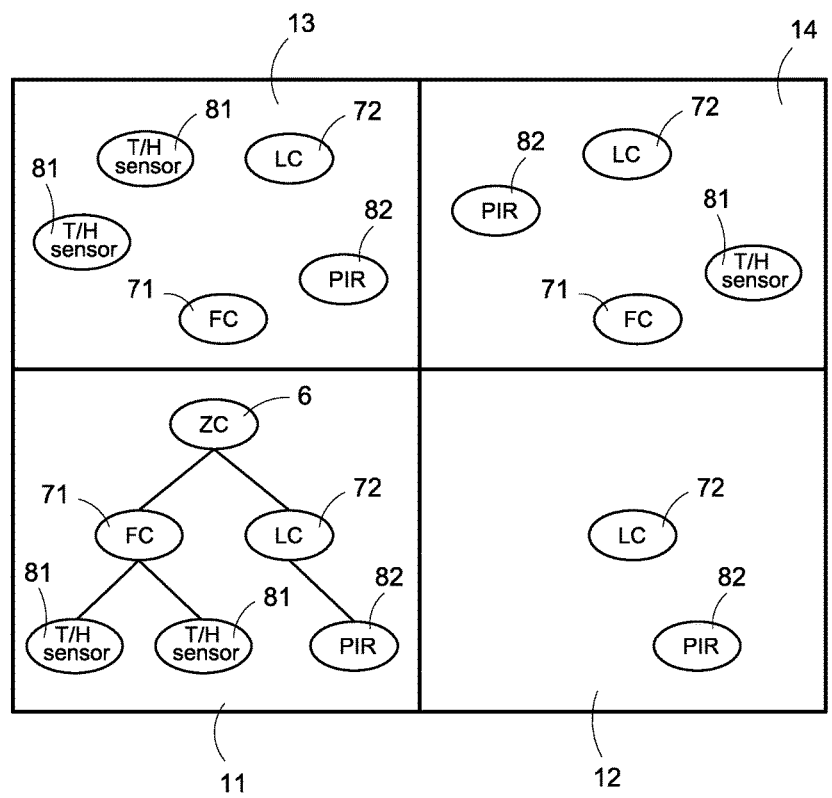
FIG. 7 is a schematic view of finishing configuration of the zone control system according to the first embodiment of the present disclosure.

Reference is made to FIG. 7 which is a schematic view of finishing configuration of the zone control system according to the first embodiment of the present disclosure. In this embodiment, the configuration apparatus 5 selects the zone controller 6 in the first zone 11 to be the target zone controller and transmits the LAN structure template T1 shown in FIG. 5 to the target zone controller. Accordingly, the LAN structure in the first zone 11 shown in FIG. 7 is automatically configured after the target zone controller executes the automatic configuration procedure.

In this embodiment, the target zone controller is connected to one fan controller 71 and one light controller 72, the fan controller 71 is connected to two temperature/humidity sensors 81, and the light controller 72 is connected to one pyroelectric infrared sensor 82. Also, the target zone controller, the fan controller 71, the light controller 72, the two temperature/humidity sensors 81, and the pyroelectric infrared sensor 82 are installed in the first zone 11. It can be seen clearly that the configured LAN structure and the established zone control system are identical to the network topology recorded in the LAN structure template T1. Therefore, the user can confirm that the LAN structure is correct to meet the predetermined expectation.

In addition, the zone controller 6 can automatically configure the correct LAN structure for the first zone without the user's manual configuration. Accordingly, the zone control system in the first zone 11 can be rapidly established to save unnecessary significant configuration time.

As shown in FIG. 7, the third zone 13 is adjacent to the first zone 11 and the fan controller 71 in the third zone 13 is adjacent to the zone controller 6 in the first zone 11.

Therefore, the correct fan controller 71 in the first zone 11 and the incorrect fan controller 71 in the third zone 13 are probably to be connected to the zone controller 6 when the fan controller 71 is searched out by the zone controller 6. Accordingly, the above-mentioned step (S36) is introduced to overcome the wrong configuration of the zone controller 6.

Figure 8A:
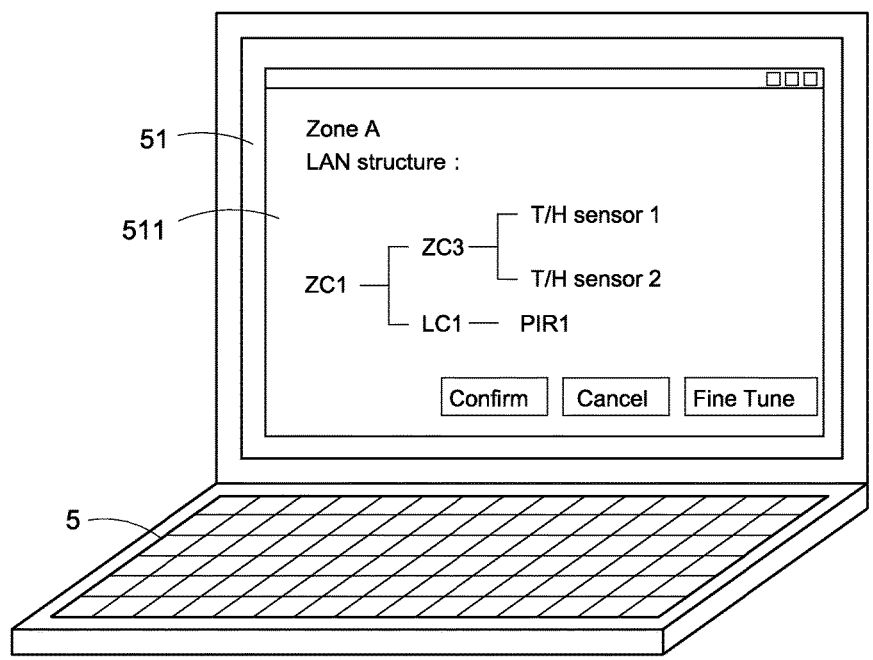
FIG. 8A is a schematic view of a LAN structure information according to the first embodiment of the present disclosure.
Figure 8B:
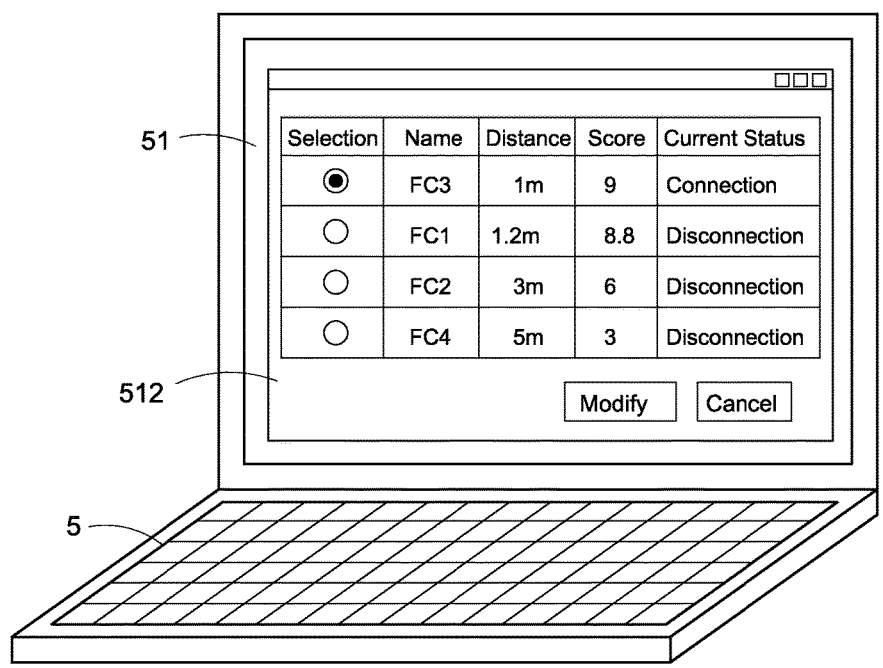
FIG. 8B is a schematic view of a fine-tuned LAN structure information according to the first embodiment of the present disclosure.

Reference is made to FIG. 8A and FIG. 8B are a schematic view of a LAN structure information and a fine-tuned LAN structure information according to the first embodiment of the present disclosure, respectively. After the step (S26) shown in FIG. 3, the configuration apparatus 5 receives the LAN structure information transmitted from the target zone controller and displays the LAN structure information on the display monitor 51. As shown in FIG. 8A, the configuration apparatus 5 can display a display page 511 on the display monitor 51 to display the received LAN structure information. The user can realize the LAN structure information via the display page 511 to confirm the current LAN structure in the zone where the target zone controller is installed.

As shown in FIG. 8A, the display page 511 displays the current LAN structure in the zone A. In particular, the ZC1 is simultaneously connected to the LC1 and the FC3; the LC1 is connected to the PIR1; and the FC3 is simultaneously connected to the T/H sensor1 and the T/H sensor2. If the user confirms that the LAN structure is wrong, the step (S36) shown in FIG. 3 can be executed to fine tune the LAN structure.

For example, it is assumed that the ZC1, the LC1, and the PIR1 are located in the first zone 11; and the FC3 is located in the third zone 13. In addition, the FC1 is further located in the first zone 11. In particular, a distance between the FC3 and the ZC1 is shorter than that between the FC1 and the ZC1. After the calculation of correlation degree, the "cost" of the FC3 is higher than that of the FC1 so that the FC3 has highest priority to be connected to the ZC1. In this embodiment, the user can trigger a fine-tune button on the display page 511 to enter a fine-tune page 512 and fine tune the LAN structure in the zone A.

As shown in FIG. 8B, the distance between the FC3 and the FC1 is 1 meter and the score is equal to 9 which is the highest score among the searched FCs. Therefore, the FC3 has highest priority to be connected to the ZC1. In addition, the FC1 and the ZC1 are located in the same zone, and the distance between the FC1 and the ZC1 is 1.2 meters and the score is equal to 8.8 which is less than the score of the FC3. Therefore, the FC1 does not have the highest priority to be connected to the ZC1 when the automatic configuration procedure is executed by the ZC1.

The user can select the FC1 to modify the LAN structure information via the fine-tune page 512 so as to disconnect to the FC3 and to establish a communication connection to the FC1. More specifically, the configuration apparatus 5 can send the control command to control the selected apparatus control node or sensor to provide the light indication or the sound notification to notify the user when the user selects any one apparatus control node, such as FC or LC or any one sensor, such as PIR or T/H sensor via the fine-tune page 512.

After the modification of the LAN structure information is confirmed by the user, the configuration apparatus 5 produces the fine-tuned LAN structure information and transmits the fine-tuned LAN structure information to the ZC1. Accordingly, the ZC1 can reconfigure the final (latest) version of the LAN structure and establish the zone control system with the latest LAN structure of the zone A.

Accordingly, each zone controller in all zones can automatically configure the LAN structure and establish the zone control system in the corresponding zones according to the LAN structure template T1 after the configuration apparatus 5 is selected. As a result, it is can be to save significant manual configuration time once the building 1 has numerous zones and numerous zone control system need to be configured.

In other embodiments, each zone controller in all zones can be pre-placed in the LAN structure template T1 adopted in the zone. Accordingly, each zone controller can select and automatically connect to the corresponding apparatus control nodes and the sensors according to the stored LAN structure template T1 after the zone controllers in all zones are started up. As a result, each zone controller does not have to waste time for waiting the transmission of the LAN structure template T1 from the configuration apparatus 5. Accordingly, it is effectively to increase configuration speed of the zone control systems.

In addition, the user can simply and conveniently operate the configuration apparatus 5 to fine tune the LAN structure even if the result of the automatic configuration procedure is wrong.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A method of automatically configuring a zone control system implemented via a configuration apparatus, the method comprising:
   (a) selecting one of a plurality of zone controllers to be a target zone controller;
   (a1) determining a zone where the target zone controller is installed, acquiring and transmitting a local area network (LAN) structure template corresponding to the zone to the target zone controller, wherein the LAN structure template records a network topology adaptable to the zone;
   (b) executing an automatic configuration for connecting with one or more apparatus control nodes of the zone according to the content of the LAN structure template and controlling the one or more connected apparatus control nodes to respectively connect with one or more sensors of the zone according to the content of the LAN structure template by the target zone controller, and establishing a LAN structure corresponding to the network topology and producing a LAN structure information of the LAN structure;
   (b1) receiving the LAN structure template by the target zone controller;
   (b2) searching adjacent apparatus control nodes and sensors;
   (b3) executing calculations of correlation degree for all searched apparatus control nodes and sensors;
   (b4) connecting to the highest correlation degree of the one or more than one apparatus control nodes; wherein the type and the number of the apparatus control nodes are identical to a network topology recorded in the LAN structure template;
   (b5) controlling the connected apparatus control nodes to connect to the highest correlation degree of the one or more than one sensors; wherein the type and the number of the sensors are identical to the network topology recorded in the LAN structure template; and (b6) configuring network structure of the zone and correspondingly producing the LAN structure information according to the target zone controller, the one or more than one apparatus control nodes, and the one or more than one sensors;

(c) receiving the LAN structure information;

(d) transmitting a confirmed LAN structure information based on the LAN structure information to the target zone controller when the LAN structure is judged to be correct;

(e) transmitting a fine-tuned LAN structure information based on the LAN structure information to the target zone controller when the LAN structure is judged to be incorrect; and (f) reconfiguring the LAN structure and establishing a zone control system by the target zone controller according to the received LAN structure information after the step (d) or the step (e).

2. The method of automatically configuring the zone control system in claim 1, further comprising before the step (a):

(a01) searching adjacent zone controllers; and (a02) displaying a list of the searched zone controllers on a display monitor.

3. The method of automatically configuring the zone control system in claim 2, further comprising after the step (a):

(a2) transmitting a control command to the target zone controller to make the target zone controller provide a light indication.

4. The method of automatically configuring the zone control system in claim 1, wherein in the step (b3), respectively calculating scores of the apparatus control nodes and the sensors according to signal strength between the apparatus control nodes and the sensors or distances between the target zone controller and the apparatus control nodes and the sensors, and judging correlation degrees according to the calculated scores.

5. The method of automatically configuring the zone control system in claim 1, wherein in the step (e), judging the LAN structure to be incorrect when the type and the number of the apparatus control nodes connected to the target zone controller do not meet the network topology or the type and the number of the sensors connected to the apparatus control nodes do not meet the network topology.

6. The method of automatically configuring the zone control system in claim 1, wherein in the step (e), judging the LAN structure to be incorrect when the target zone controller, the apparatus control nodes, and the sensors are not located in the same zone.

7. The method of automatically configuring the zone control system in claim 1, wherein in the step (e), displaying the LAN structure information via a configuration apparatus, receiving an external operation to fine tune the LAN structure information to produce the fine-tuned LAN structure information, and replying the fine-tuned LAN structure information to the zone controller.

* * * * *